United States Patent [19]

Nojiri et al.

[11] 4,137,285

[45] Jan. 30, 1979

[54] GAS-LIQUID CONTACT APPARATUS

[75] Inventors: Michihiko Nojiri, Takaishi; Tatsuo Watanabe, Fujiidera; Kazuyoshi Matsuo, Sakai, all of Japan

[73] Assignee: Mitsui Engineering & Shipbuilding Co., Ltd., Tokyo, Japan

[21] Appl. No.: 804,443

[22] Filed: Jun. 7, 1977

[30] Foreign Application Priority Data

Jun. 24, 1976 [JP] Japan .................................. 51/74887
Sep. 27, 1976 [JP] Japan .................................. 51/115559

[51] Int. Cl.² ............................................. B01F 3/04
[52] U.S. Cl. ........................................ 261/93; 261/124
[58] Field of Search .................. 261/93, 124; 210/219

[56] References Cited

U.S. PATENT DOCUMENTS

| 697,069 | 4/1902 | Brushaber | 261/93 |
| 1,744,785 | 1/1930 | McTaggart | 261/93 X |
| 1,748,107 | 2/1930 | Butchart | 261/93 |
| 2,521,396 | 9/1950 | Moul | 261/93 |
| 3,293,861 | 12/1966 | Hinde | 261/124 X |
| 3,420,370 | 1/1969 | Isenhardt et al. | 261/93 X |
| 3,521,864 | 7/1970 | Welles, Jr. | 261/93 X |
| 3,547,811 | 12/1970 | McWhirter | 261/93 X |
| 3,802,674 | 4/1974 | Hori | 261/93 |

FOREIGN PATENT DOCUMENTS

| 200519 | 4/1958 | Austria | 261/93 |
| 676270 | 5/1939 | Fed. Rep. of Germany | 261/93 |

*Primary Examiner*—Richard L. Chiesa
*Attorney, Agent, or Firm*—Thomas E. Beall, Jr.

[57] ABSTRACT

A gas-liquid contact apparatus for contacting gas with liquid by dispersing air to form fine air bubbles in the liquid power with minimum consumption of power which comprises: a vessel in which liquid held; a perforated pipe with a plurality of apertures through which gas is ejected into the liquid; and a rotor with blades radially attached thereto within the vessel, each blade of which is positioned in parallel to the axis of the perforated pipe and passes in proximity to the apertures so that gas is sheared by said rotating blades immediately after it is ejected from the apertures.

7 Claims, 6 Drawing Figures

GAS-LIQUID CONTACT APPARATUS

BACKGROUND OF THE INVENTION

The present invention relates to a gas-liquid contact apparatus, and more particularly to a gas-liquid by generating a large number of fine gas bubbles in the liquid.

Hitherto, the following methods have been known in enhancing the efficiency of contact between gas and liquid by increasing a contact area of gas and liquid:

(1) A shaft or propeller of a propeller stirrer is of a hollow structure with perforations being formed in its side wall. Gas is supplied to the hollow shaft and ejected through the perforations to produce fine air bubbles.

(2) Gas is ejected into liquid through pores of unglazed pottery or the like to form fine air bubbles.

(3) Gas is supplied to an interior of a turbine blade to be ejected into the gas-liquid mixture.

(4) Liquid under pressure is supplied to a venturi tube and mixed with gas by the actions of suction and movement of gas in the tube.

However, those methods have the following disadvantages. In the above method (1), the effeciency of producing fine air bubbles is low, power consumption is high in stirring the liquid, average diameter of the air bubbles is relatively large, and a rate of miniaturization of gas is low. In the method (2), resistance of gas passing througn the pores is high, so that high compression power is required, clogging of the pores occurs frequently when the liquid to be treated contains hard-to-disslove or easy-to-deposit material, and the efficiency of contacting gas with liquid becomes low. In the method (3), power dissipation is high when a large scale apparatus is used; large size air bubbles increase and fine air bubbles cannot be produced when the amount of gas increases. In the method (4), a ratio of the amount of suction gas required to the amount of supplied liquid is small and power dissipation is relatively high.

In order to minimize the power dissipation while attaining a high efficiency of generation of fine air bubbles, a method has been proposed wherein gas is ejected from under a rotor having a vertical hollow cylindrical body which rotates horizontally at the bottom level in a liquid contact vessel so that a gas film is formed on the surface of the cylindrical body to enhance generation of fine air bubbles (See Japanese Patent Publication No. 43-13121 (1968)).

However, although the proposed method reduces the power dissipation, it can make only a small amount of fine air bubbles, and this trend becomes remarkable as the amount of air increases.

Furthermore, the apparatus having a cylindrical rotor with vertical axis has a drawback that the liquid is not stirred sufficiently throughout the whole vessel. Also, the vertical hollow cylindrical rotor requires special mechanism and special care for balancing the rotor when rotating.

BRIEF SUMMARY OF THE INVENTION

It is an object of the present invention to overcome the disadvantages in the prior art and provide a gas-liquid contact apparatus which is reduced in the power comsumption for generating fine air bubbles.

It is another object of the present invention to provide a gas-liquid contact apparatus which is capable of generating a large amount of fine air bubbles in the liquid.

Other objects, features and advantages of the present invention will become apparent fully from the following description.

The inventors of the present invention have made extensive studies on an apparatus for miniaturizing air bubbles in liquid and found that air bubbles are divided finely to form a large amount of fine air bubbles by rotating a rotor with blades in proximity to gas scattering apertures.

DETAILED DESCRIPTION OF THE INVENTION

The present gas-liquid contact apparatus comprises: a vessel in which liquid is held; a perforated pipe with a plurality of apertures for dispersion of gas mounted within the vessel; and a rotor having blades radially attached thereto within the vessel, each blade of which is positioned in parallel to the axis of the perforated pipe and in proximity to the apertures when the rotor rotates so that the gas is sheared by the blades immediately after it is ejected from the apertures.

In accordance with one aspect of the present invention, the pipe has a plurality of apertures perforated on its wall and alined in parallel to the axis of the pipe. In this specification, apertures mean holes or slits. The perforated pipe is usually mounted near the bottom of the gas-liquid contact vessel, although it may be mounted at other positions required. It is desirable that the gas dispersion apertures are arranged on a line parallel to the axis of the perforated pipe and downwardly so that gas is blown downward. The end of the perforated pipe is connected to a gas supply tube through which the gas is introduced.

A diameter of the gas dispersion hole is preferably in the range of 1.0 to 5.0mm, more preferably in the range of 2.0 to 3.0mm.

The rotor with the blades is mounted near the gas dispersion holes (or slits), the blade being slightly spaced from the hole when rotating so that the gas is sheared by the rotating blades immediately after it is ejected from said holes. A clearance between the circumferential end of the rotating blade and the gas dispersion hole is in the range of 1mm to 10mm, preferably in the range of 1mm to 5mm. The blades are attached radially to a rotary shaft which is supported rotatably to the side wall of the vessel and the end of the rotary shaft is connected to an appropriate driving source outside of the vessel. It is preferable that the holes or slits on the surface of the pipe are positioned on the hypothetical line (plane) passing through both axes of the rotary shaft and of the perforated pipe in their cross section.

The present invention can more fully be understood from the following description taken in conjunction with the accompanying drawings in which.

Figure 1:
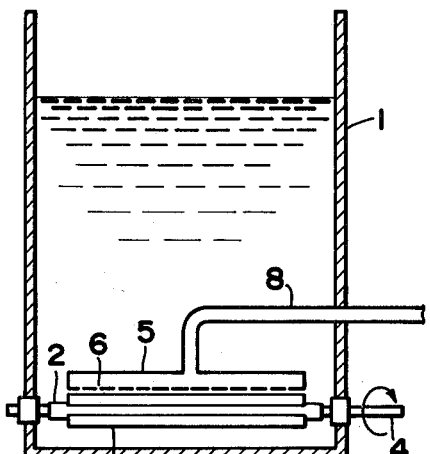
FIG. 1 is a front sectional view illustrating one embodiment of a gas-liquid contact apparatus of the present invention.

Referring to FIG. 1, the gas-liquid contact apparatus includes: a gas-liquid contact vessel 1; blades 3 attached radially to a rotary shaft 2 which is supported rotatably through the side wall of the vessel 1; and a gas dispersion unit comprising a perforated pipe 5 slightly spaced from the circumferential ends of the rotating blades 3, and a gas supply tube 8. A plurality of (six in the illustrated example) blades 3 are attached radially at every 60° angle to a rotary shaft 2 which is rotatably supported at the side walls of the vessel 1. The rotary shaft 2 is connected to a power transmission shaft 4 extended to the outside of the vessel, to which a rotating power is applied.

Figure 2:
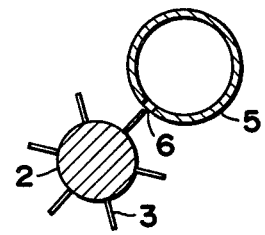
FIG. 2 is an enlarged side sectional view illustrating an arrangement of blades and a perforated pipe in the apparatus shown in FIG. 1.

FIG. 2 is an enlarged sectional view illustrating the arrangement of the perforated pipe 5 and the blades 3. As shown, the perforated pipe 5 is arranged such that the holes 6 thereof are positioned in the proximity to the rotating blade 3 and positioned on a hypothetical line (Plane) passing through both axes of the rotary shaft 2 and of the perforated pipe 5 in their cross section.

Figure 3:
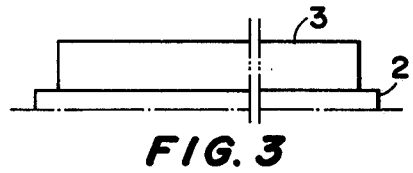
FIG. 3 is a fragmentary front view of a blade attached to the rotary shaft in the apparatus shown in FIG. 1.
Figure 4:
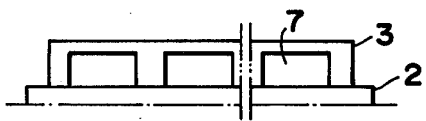
FIG. 4 is a fragmentary front view of a modified blade attached to a rotary shaft.
Figure 5:
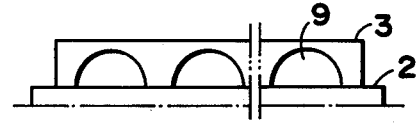
FIG. 5 is a fragmentary front view of another modified blade attached to a rotary shaft.

Although the blade may be of plate-shape long enough to extend over the entire length of the aligned holes as shown in FIG. 1 and FIG. 3, it may be divided into fragments, or may have openings of appropriate shape as shown in FIG. 4 and FIG. 5 where the blades having rectangular openings 7 and semicircular openings 9 are indicated respectively.

The above openings are effective to prevent possible deposition of solid components by the reaction of the liquid to the rotating blades or to the spaces between the blades. The efficiency of contacting gas with liquid is increased by the provision of those openings.

The radial length of the blades is not restricted, and a satisfactory performance is achieved even when it is very small with a ratio such as in the order of 1/100 relative to the diameter of the gas-liquid contact vessel.

Also, in order to attain high efficiency of gas-liquid contact, the blade may have a bar of a peculiar shape at the circumferential end of it, for example of circular shape, of half-circular shape, of triangle shape, of square shape, or of half-square-shape in its cross sectional view.

While six blades are attached to the rotary shaft in the above embodiment, more than six blades may be used as the scale of the apparatus is enlarged and the diameter of the rotary shaft increases, in order to generate a large amount of fine air bubbles.

The perforated pipe 5 is connected to the gas supply tube 8 in its upper central position and the tube 8 extends through the wall to the outside of the vessel 1. The perforated pipe 5 is arranged in proximity to and in parallel to the rotating blades. A plurality of gas dispersion holes 6 are formed at equal pitch by perforating the wall of the pipe 5 at the position where a hypothetical plane passing through both axis of the pipe 5 and of rotary shaft 2 crosses the wall.

More than one gas dispersion unit or more than one rotor with the blades of the present invention may be arranged in a single gas-liquid contact reaction vessel. Further, the above gas dispersion units may be arranged vertically or obliquely in the vessel.

In the apparatus shown in FIGS. 1 and 2, gas is supplied from the gas supply tube 8 through the perforated pipe 5 and blown through the gas dispersion holes 6 into the gas-liquid vessel 1. The blown gas is instantly sheared and mixed with the liquid by the rotational force of the rotating blades (rotating speed of the rotor is 1000 r.p.m. to 4,000 r.p.m.) to generate fine air bubbles. The liquid in the vessel is thus effectively stirred, and uniform fine air bubbles are generated like those generated when a cap of a soda pop bottle is opened. Thus, efficient contact of the gas with the liquid is attained. This advantage is obtained even at a high flow rate of gas supply (e.g. approximately 0.7 VVM (ratio of the amount of gas flow to the amount of liquid in the vessel per minute). Further, the air bubbles generated have uniform and fine diameter, accordingly, the surface of liquid level which is raised by bubbling is maintained flatly.

Figure 6:
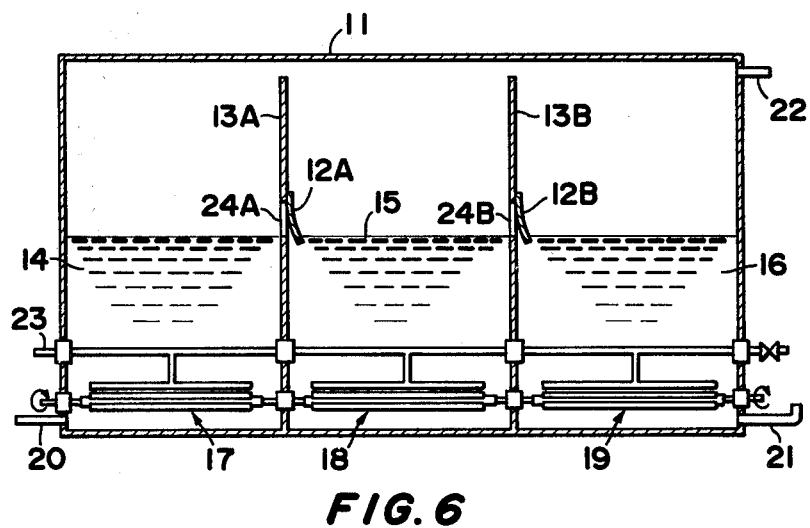
FIG. 6 is a schematic sectional view of one embodiment of a multi-stage gas-liquid contact apparatus of the present invention.

FIG. 6 shows another embodiment of the air-liquid contact apparatus of the present invention.

In FIG. 6, the apparatus comprises a vessel 11 having a plurality of chambers 14, 15 and 16 defined by partitions 13A and 13B, and gas dispersion units 17, 18 and 19 mounted in respective chambers. Each chamber communicates with the adjacent chamber at the upper end of the partition and at a communicating port 24A or 24B. Liquid can overflow through the communicating port 24A or 24B to the adjacent chamber, and a flexible seat member 12A or 12B such as a synthetic elastic resin seat is attached to the partition at the side of the exit of the liquid so that the seat member 12A or 12B closes the communicating port 24A or 24B when the liquid level is under the port and opens it when the liquid level is over the port. The flexible seat member 12A or 12B has an upper end attached to the partition at a position above the communicating port, and has a lower end abutted against the partition on the side of the exit of the liquid at a position below the communicating port 24A or 24B, as shown in FIG. 6. Each of gas dispersion units 17, 18 and 19 is similar to the one as shown in FIG. 1.

In the above apparatus, liquid raw material is supplied from a supply tube 20 to a first chamber 14 and raises the liquid level. When the liquid level rises above the lower end of the communicating port 24A, the seat member 12A flexes so that the liquid flows into a second chamber 15. The liquid supplied to the second chamber 15 does not flow back to the first chamber 14 when the liquid level in the second chamber 15 rises above the lower end of the communicating port 24A because the seat member contacts the side wall of the exit of the partition 13A and is kept in close contact thereto by liquid pressure. The liquid is thereafter supplied from the second chamber 15 to the third chamber 16 in the same manner as described above, and then taken out through an outlet pipe 21.

Gas is supplied from a tube 23 to each of the gas dispersion units 17, 18 and 19 mounted at the bottom of the chambers 14, 15 and 16 and mixed with the liquid. Exhausted gas is delivered from a pipe 22 through communicating opening above the upper ends of the partitions 13A and 13B.

The above apparatus is preferably used for multi-stage continuous culturing of microbes.

EXAMPLE 1

The gas-liquid contact apparatus shown in FIG. 1 was used to air-oxidize $Na_2SO_3$ solution having an initial concentration of 0.12 mole/1l. The specifications of the apparatus are as follows.

Gas-liquid contact vessel: 500mm × 500mm, 1200mm in height.

Gas dispersion apertures: 15 holes aligned in parallel to the axis of a pipe, 1.5mm in hole diameter, 30mm in pitch between the centers of the neighboring holes.

Rotating blades: 6 plane-shape blades of FIG. 4 attached every 60° angle to a rotary shaft radially, 5mm in radial length of each blade, 3mm in radial length of rectangular opening of each blade.

Rotary shaft (Rotor): 25mm in diameter.

Clearance between the hole and the circumferential end of the rotating blade: 5mm The results of experiments are shown in the following table 1.

Table 1

| Experiment No. | Rotation Speed (r.p.m.) | Amount of Air (Nl/min) | Amount of Liquid (l) | Depth of Liquid (cm) | Temperature of Liquid (°C) | Reaction Rate (g mol /l.hr) | Transfer Rate of $O_2$ (g-$O_2$ /l.hr) | Utilization Efficiency of $O_2$ (%) |
|---|---|---|---|---|---|---|---|---|
| 1 | 3400 | 40 | 210 | 85 | 23→28 | 0.149 | 2.38 | 75.7 |
| 2 | 3440 | 70 | 210 | 85 | 23→27 | 0.231 | 3.70 | 67.3 |
| 3 | 3440 | 140 | 210 | 85 | 23→27 | 0.320 | 5.12 | 46.6 |

EXAMPLE 2

The gas-liquid contact apparatus shown in FIG. 1 was used to air-oxidize $Na_2SO_3$ solution having on initial concentration of 0.12mole/l. The specifications of the apparatus are as follows.

Gas-liquid contact vessel: 500mm × 500mm, 1500mm in height.

Gas dispersion apertures: 15 holes sligned in parallel to the axis of a pipe, 3.0mm in hole diameter, 30mm in pitch between the centers of the neighboring holes.

Rotating blades: 16 Plane-shape blades attached every 22.5° angle to a rotary shaft radially, 6mm in radial length of each blade, 4mm in radial length of rectangular opening of each blade.

Rotary shaft (Rotor): 110mm in diameter.

Clearance between the aperture and the end of the blade: 3mm

The results of experiments are shown in the hollowing table 2.

Table 2

| Experiment No. | Rotation Speed (r.p.m.) | Amount of Air (Nl/min) | Amount of Liquid (l) | Depth of Liquid (cm) | Temperature of Liquid (°C) | Reaction Rate (g mol /l.hr) | Transfer Rate of $O_2$ (g-$O_2$ /l.hr) | Utilization Efficiency of $O_2$ (%) |
|---|---|---|---|---|---|---|---|---|
| 4 | 1110 | 135 | 270 | 105 | 13→19 | 0.316 | 5.05 | 65.5 |
| 5 | 1110 | 260 | 260 | 102 | 13→19 | 0.507 | 8.11 | 48.3 |
| 6 | 1110 | 360 | 240 | 96 | 13→19 | 0.579 | 9.26 | 36.7 |

Comparison of the present gas-liquid contact apparatus with the prior art gas-liquid contact apparatus (disclosed in the above-mentioned Japanese Patent Publication 43-13121 (1968)) is mentioned below. The prior art apparatus captures the gas in the form of film around the rotor and generates fine air bubbles by the rotational force of the rotor. The present apparatus instantly shears and mixes the gas ejected from the gas dispersion apertures by the rotational force of the rotor and the blades the shear is effective for generating fine gas bubbles and the mixing is accomplished by capturing the sheared gas bubbles around the rotor as long as possible and thereby dispersing the fine gas bubbles simultaneously. Accordingly, the present apparatus can generate a much greater amount of fine gas bubbles than the prior art apparatus. Further, the prior apparatus reduces its efficiency of contacting gas with liquid when a large amount of gas is introduced in the vessel, while the present apparatus achieves excellent performance under such circumstance.

As described above, according to the present gas-liquid contact apparatus, effective stirring and miniaturization of gas bubbles are simultaneously attained; and a large amount of fine gas bubbles are generated and distributed uniformly throughout the vessel; consequently a high efficiency of contacting gas with liquid is attained even when the depth of the liquid is small.

Furthermore, a high efficiency of the gas-liquid contact is maintained even when the diameter of the rotary shaft and the radial length of the rotating blade are very small relative to the diameter of the contact vessel. Therefore, the power dissipation is much smaller than that required in the prior art apparatus.

What is claimed is:

1. A gas-liquid contact apparatus, comprising:
   a vessel for holding the liquid and maintaining a fixed liquid level;
   pipe means stationarily mounted within said vessel being provided with a plurality of apertures arranged along a fixed path below the liquid level;
   gas supply means extending through said vessel for conducting pressurized gas to said pipe means to eject the gas through said apertures into the liquid;
   rotor means including a shaft mounted for rotation about a fixed axis within said vessel below the liquid level, and power transmission means extending through said vessel and being drivingly connected to said shaft for rotating said shaft about its axis;
   said rotor means further including a plurality of blades mounted on said shaft to be spaced about the periphery of said shaft and extend generally radially, outward from said shaft axis, and said blades being provided with radially outermost surfaces, so that with rotation of said shaft, said outermost surfaces pass closely adjacent said fixed path of apertures.
   and said rotor means shearing gas bubbles from the gas being ejected through said apertures;
   the path of said apertures being in a straight line parallel to and spaced from said shaft axis;
   said apertures extending downwardly away from said pipe means so as to eject the gas downwardly with respect to said vessel.

2. The apparatus of claim 1, wherein said peripheral outermost surfaces have a clearance with respect to said apertures as said shaft rotates that is within the range of 1mm. to 10mm.

3. The apparatus of claim 2, wherein said clearance is in the range of 1mm. to 5mm.

4. The apparatus of claim 1, wherein said apertures are holes having a diameter in the range of 1.0mm. to 5.0mm.

5. The apparatus of claim 4, wherein said holes have a diameter in the range of 2.0mm. to 3.0mm.

6. The apparatus of claim 1, wherein said apertures are slits being elongated in the direction of said aperture path.

7. The apparatus of claim 1, wherein said vessel is divided by partitions into a plurality of chambers for separately containing liquid therein;
   each of said chambers having one of said rotor means and one of said pipe means; and
   each of said partitions including a liquid passageway extending through it at about the fixed liquid level of at least one adjacent chamber, and a one-way liquid valve for each of said passageways permitting flow of liquid through said passageway only in the direction from said at least one adjacent chamber to the other adjacent chamber for each partition.

* * * * *